United States Patent
Messerschmidt et al.

(10) Patent No.: US 12,006,676 B2
(45) Date of Patent: Jun. 11, 2024

(54) DRAINAGE BODY UNIT, DRAINAGE BODY SYSTEM AND SHAFT ELEMENT

(71) Applicant: ACO SEVERIN AHLMANN GMBH & CO KOMMANDITGESELLSCHAFT, Büdelsdorf (DE)

(72) Inventors: Heino Messerschmidt, Lütjenwestedt (DE); Stefan Prakesch, Wernau (DE); Anja Sievers, Rendsburg (DE)

(73) Assignee: ACO AHLMANN SE & CO. KG, Budelsdorf (DE)

( * ) Notice: Subject to any disclaimer, the term of this patent is extended or adjusted under 35 U.S.C. 154(b) by 585 days.

(21) Appl. No.: 17/056,255

(22) PCT Filed: May 8, 2019

(86) PCT No.: PCT/EP2019/061831
§ 371 (c)(1),
(2) Date: Nov. 17, 2020

(87) PCT Pub. No.: WO2019/215238
PCT Pub. Date: Nov. 14, 2019

(65) Prior Publication Data
US 2023/0054894 A1    Feb. 23, 2023

(30) Foreign Application Priority Data
May 11, 2018    (DE) .................... 10 2018 111 300.5

(51) Int. Cl.
*E03F 1/00* (2006.01)
*E03B 3/03* (2006.01)
(52) U.S. Cl.
CPC ................ *E03F 1/002* (2013.01); *E03B 3/03* (2013.01); *E03F 1/005* (2013.01)

(58) Field of Classification Search
CPC .......... E03F 1/002; E03F 1/003; E03F 1/005; E03B 3/03; E03B 3/06; E03B 3/11; E03B 3/18
See application file for complete search history.

(56) References Cited

U.S. PATENT DOCUMENTS 5,810,510 A * 9/1998 Urriola .................. E03F 1/005
  210/170.03
5,848,856 A * 12/1998 Bohnhoff ................ E03F 1/005
  405/36

(Continued)

FOREIGN PATENT DOCUMENTS

AU    2010305331 A1 * 5/2012 ............. A01G 25/06
CN      1324423 A * 11/2001 ............. E03B 11/02

(Continued)

OTHER PUBLICATIONS

An Office Action issued in corresponding Chinese Patent Application No. 201980031772.2; dated Jun. 24, 2021.

(Continued)

*Primary Examiner* — Frederick L Lagman
(74) *Attorney, Agent, or Firm* — Pearne & Gordon LLP

(57) ABSTRACT

The invention relates to a drainage-body unit having at least one drainage-body element (10), at least one first shaft element (11) and at least one second shaft element (12), wherein a treatment element (13) is located in the first shaft element (1) between a fluid inlet (14), and a fluid outlet (15), a throttle element (16) is located in the second shaft element (12) between a fluid inlet (17) and a fluid outlet (18), and the shaft elements (11, 12) are or can be fluidically connected to one or more drainage-body elements (10).

19 Claims, 3 Drawing Sheets

(56) References Cited

U.S. PATENT DOCUMENTS

| | | | | |
|---|---|---|---|---|
| 7,374,670 | B2* | 5/2008 | Potts | C02F 3/02 |
| | | | | 210/150 |
| 7,833,413 | B1* | 11/2010 | Rotondo | E03F 1/002 |
| | | | | 210/170.03 |
| 8,894,866 | B1* | 11/2014 | Belasco | E03F 5/10 |
| | | | | 210/170.03 |
| 9,732,508 | B1 | 8/2017 | Kent et al. | |
| 2005/0155285 | A1* | 7/2005 | Urban | A01G 13/0237 |
| | | | | 47/32.7 |
| 2009/0279953 | A1* | 11/2009 | Allard | E03F 1/005 |
| | | | | 405/39 |
| 2010/0021236 | A1* | 1/2010 | Kreikemeier | E03F 1/005 |
| | | | | 405/55 |
| 2011/0253238 | A1* | 10/2011 | Burkhart, Sr. | E03F 1/005 |
| | | | | 137/580 |
| 2014/0105684 | A1* | 4/2014 | Allard | E02B 11/00 |
| | | | | 405/52 |
| 2016/0273208 | A1* | 9/2016 | Dirne | E03F 5/101 |
| 2022/0371928 | A1* | 11/2022 | Howell | C02F 1/001 |

FOREIGN PATENT DOCUMENTS

| | | | | |
|---|---|---|---|---|
| CN | 202000464 | U | 10/2011 | |
| CN | 105672461 | A | 6/2016 | |
| DE | 3418813 | A1 | 11/1985 | |
| EP | 0877126 | A2 | 11/1998 | |
| EP | 2085527 | A1 | 8/2017 | |
| KR | 20100008787 | A * | 1/2010 | |
| KR | 101222885 | B1 * | 1/2013 | A01G 25/06 |
| RU | 2464385 | C2 | 7/2012 | |

OTHER PUBLICATIONS

An Office Action issued in corresponding European Patent Application No. 19 723 753.0; dated Dec. 5, 2022.

An Office Action issued in corresponding Russian Patent Application No. 2020139961/10; dated Jun. 21, 2021.

* cited by examiner

DRAINAGE BODY UNIT, DRAINAGE BODY SYSTEM AND SHAFT ELEMENT

The Invention relates to a drainage-body unit and a shaft element for such a drainage-body unit.

Two problems related to existing drainage bodies currently exist. First, drainage bodies must be protected in their interior from silting or sludging. Second, the water flow must be adjustable on the outlet side of the drain, in that official regulations prescribe a maximum water-discharge amount. For this purpose, a throttle is provided, which is intended to relieve the downstream sewer network or the downstream receiving water body. This is achieved with a static throttle without moving parts, or a dynamic throttle with a variable flow cross-section. Dynamic throttles are capable of maintaining a constant discharge value. This leads to smaller retention basins, in that the maximum discharge value always sets during regular operation. At the same time, the operator can fix the settings, e.g., for treatment or emergency operations, in order to contribute to damage mitigation, e.g., in the event of heavy rainfall. Constant throttles that regulate themselves depending on the water level also exist, however, with very large space requirements.

EP 1 526 223 B1 describes a drainage arrangement, in which the rainwater is fed through a lateral inlet shaft connected to the drainages. The rainwater is removed via a removal shaft, which penetrates the drainage bodies vertically from above. Functional elements, i.e., a fluid line, a combined pump and filter unit, as well as a fill-level gauge are located in the Inlet shaft or removal shaft. The known drainage arrangement is complex and requires a relatively large amount of space.

The invention is based on the object of specifying a drainage-body system, which simplifies the installation of a drainage-body system, can be connected to a sewer system and is protected against dogging by solids. The Invention is, furthermore, based on the object of specifying a drainage-body system and a shaft element for such a drainage-body unit.

According to the invention, this object is achieved with regard to the drainage-body unit by the subject matter of claim 1, with regard to the bed drainage-body system by the subject matter of claim 18, and with regard to the shaft element by the subject matter or claim 19.

Specifically, the object is achieved by a drainage-body unit with at least one drainage-body element, at least one first shaft element and at least one second shaft element. In the first shaft element, a treatment element is located between a fluid inlet and a fluid outlet. A throttle element is located in the second shaft element between a fluid inlet and a fluid outlet. The shaft elements are fluid-connected or fluid-connectable with one or more drainage-body elements.

The invention has the advantage that the treatment element, the throttle element and the drainage-body element are Integrated into one unit. The treatment, storage and discharge functions are combined into a common element according to a three-in-one principle. The drainage-body unit or a drainage-body system consisting of many drainage-body elements connected to the drainage-body unit according to the invention, can be connected to a sewer system by means of the throttle element. The treatment element prevents the drainage-body unit or a drainage-body system connected to the drainage-body unit from silting or sludging. The drainage-body element stores fluid, e.g., rain water, or is suitable for this purpose, and may be connected to a drainage-body system consisting of a plurality of drainage-body elements, thereby increasing the storage capacity. The drainage-body unit, itself, may contain several drainage-body elements, e.g., 2, 3, 4 or 5 drainage-body elements, in order to increase the storage capacity of the drainage-body unit to some extent. A conventional drainage-body system has more drainage-body elements than the drainage-body unit according to the invention. In contrast to the drainage-body system, the drainage-body unit according to the Invention may be handled independently as a unit, e.g., with a forklift at a construction site. Due to the drainage-body element Integrated in the drainage-body unit according to the invention, the drainage-body unit according to the invention is easily connectible to a drainage-body system with a greater number of drainage-body elements.

A drainage device with two shafts is actually known from EP 1 526 223 B1. However, the shafts do not form a drainage-body unit within the meaning of the Invention, in that the shafts form an integral part of a large drainage-body system with a plurality of drainage-body elements, and do not form a well-defined drainage-body unit.

The Invention comprises both a drainage-body unit, whose drainage-body element is unfilled, i.e., without a filling material, such as gravel, and a drainage-body unit, whose drainage-body element is filled with a filling material, such as gravel, as is the case, e.g., in the installed state.

Preferred embodiments of the invention are specified in the subclaims.

The shaft elements and the drainage-body element, or several drainage-body elements, may be Integrated into a single, uniformly manageable component. The drainage-body unit forms an independent component, which fulfills the functions of treatment, storage and discharge, and is installed or stored, as such.

In a preferred embodiment, the drainage-body element or several drainage-body elements are located between the shaft elements. This has the advantage that the shaft elements are spaced apart from one another by the drainage-body element. If the drainage-body element is connected to a primary drainage-body system, the treatment element and the throttle element form the inlet and outlet for the whole system.

The shaft elements and the drainage-body element, or several drainage-body elements, are preferably located in one and the same level. The drainage-body unit thus formed is compact and easily installed. In the case of a drainage-body unit, which is made up of several levels arranged vertically on top of one another, the shaft elements and the drainage-body element or several drainage-body elements are arranged on the lowest level. This provides the advantage that the fluid flow is driven by gravity. This removes the need for pumps.

In the context of the invention, the installation of a drainage-body unit according to the invention on the lowest level of a drainage-body system, which consists of several levels of drainage-body elements arranged vertically on top of one another, is disclosed and claimed.

If the fluid inlet of the first shaft element and the fluid outlet of the second shaft element are located at different heights, e.g., if the fluid inlet is located higher than the fluid outlet, a gradient is created between the fluid inlet and the fluid outlet, such that the rainwater can flow from the treatment element through the drainage-body element and on to the throttle element.

Preferably, the fluid inlets and outlets are arranged horizontally, which facilitates connection in the same level of the drainage-body system.

For a simple and compact design, the fluid connection of the shaft elements to the drainage-body element(s) may form a direct connection through Immediately adjacent wall openings.

In a particularly preferred embodiment, the shaft elements are designed as shaft substructures with one access opening for access from above, a dosed bottom, and dosed walls. The fluid inlets and outlets are located in the dosed walls.

The shaft elements may have shaft superstructures, which facilitates access to the shaft elements and the functional elements located therein.

The treatment element preferably comprises at least one fluid-treatment agent selected from the group consisting of a slotted screen, sedimentation agents, adsorption agents, and mechanical pretreatment agents. The aforementioned fluid-treatment agents may be used separately or in combination with one another.

In a particularly preferred embodiment, a guide and/or support device is located in the first shaft element for the treatment element. The guide and/or support device divides the first shaft element into a treated side and an untreated side. The dual function of the guide and/or support device achieves a compact design, which also keeps solids away from the drainage-body element.

The guide and/or support device may comprise a pipe, which is connected in a fluid-tight manner to the fluid inlet of the first shaft element on the untreated side. The pipe has an opening on the treated side, which forms a fluid connection to the fluid outlet of the first shaft element. To this end, the opening may be located, e.g., opposite the fluid outlet of the first shaft element. The fluid outlet may form a simple opening in the side wall of the shaft element. A fluid-tight connection is not required, in that the pipe is connected in a fluid-tight manner with the fluid inlet on the untreated side. The pipe represents a simple and safe way of dividing the first shaft element into a treated side and an untreated side, while keeping the treatment element secure.

For securing the treatment element, in particular the slotted screen, the guide and/or support device, in particular the pipe, may have guide and/or support rails, in which the slotted screen Is arranged.

In a particularly preferred embodiment, the throttle element comprises a controlled throttle element connected to a servomotor. Thus, the amount of outflowing water may be adapted to the respective requirements of the downstream sewer system.

If the servomotor Is located above the second shaft element, maintenance and assembly of the servomotor Is made easier.

The throttle element may be connected on the outlet side to the fluid outlet of the second shaft element in a fluid-tight manner. This has the advantage that the inlet side of the second shaft element may be connected to a drainage-body element in a simple and direct manner without Impairing the throttling effect.

The throttle element may comprise a throttle valve, a throttle with a knife gate valve or a throttle for mechanical pipe formation.

In addition to the drainage-body unit, the two shaft elements with the treatment element and the throttle element, respectively, are claimed separately per se, i.e., Independently of the drainage-body element.

Moreover, a drainage-body system, which comprises a plurality of drainage-body elements, and at least one drainage-body unit according to the Invention, is claimed. The drainage-body unit according to the Invention thus forms a subunit of the primary, drainage-body system.

The Invention is explained in more detail below by means of an embodiment and with reference to the attached schematic drawings.

Figure 3:
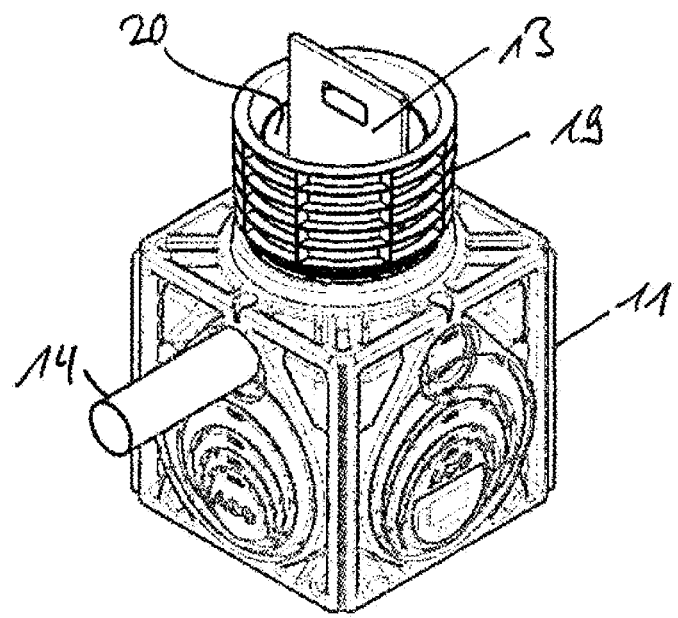
FIG. 3 is a perspective view of a shaft element with a treatment element according to an exemplary embodiment of the Invention.
Figure 4:
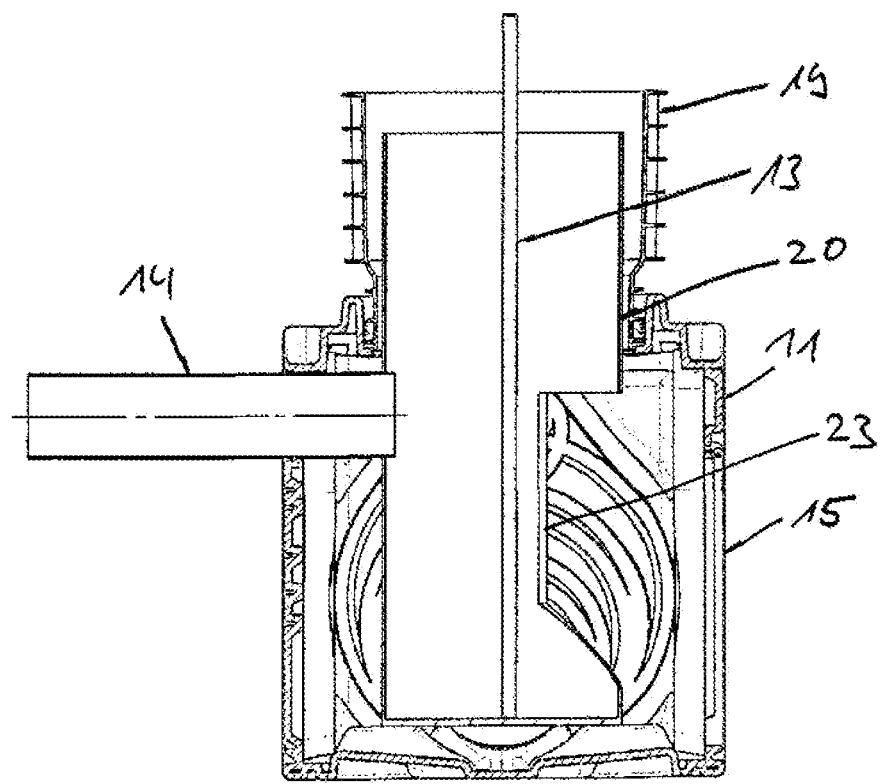
FIG. 4 is a section of the shaft element according to FIG. 3
Figure 5:
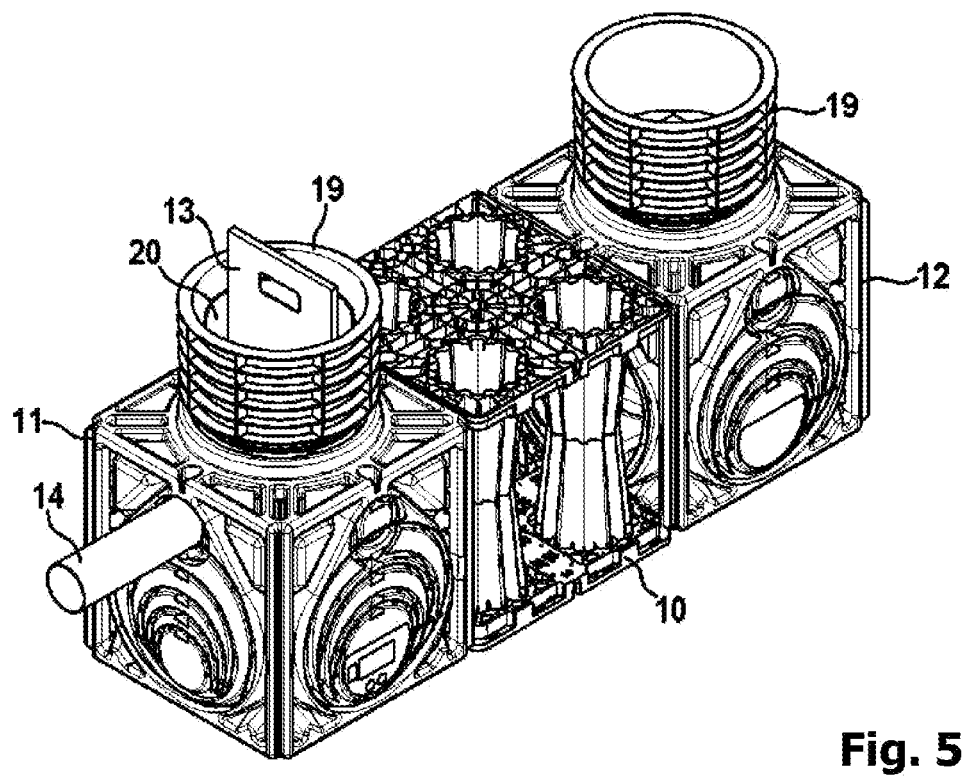
FIG. 5 is a perspective view of a drainage-body unit according to an exemplary embodiment of the invention.
Figure 6:
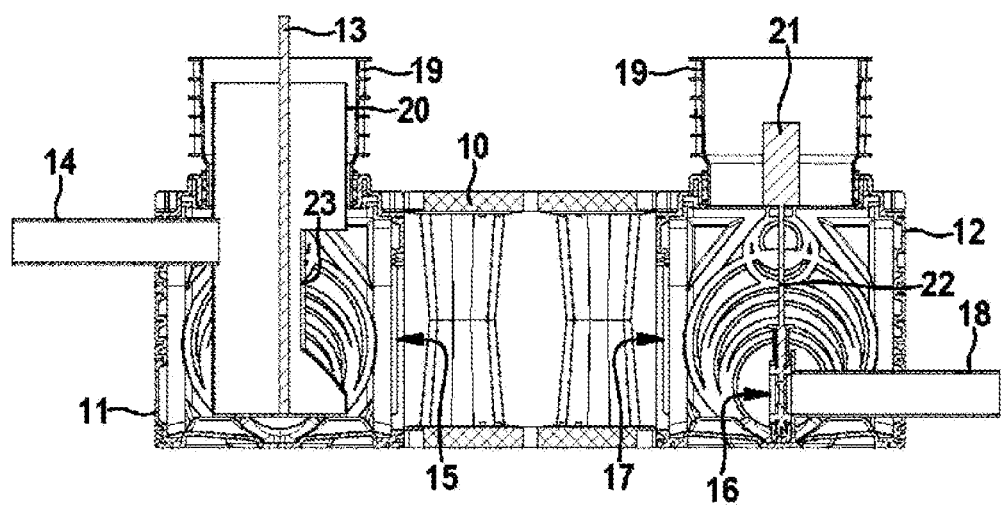
FIG. 6 is a section of the drainage-body unit according to FIG. 5

FIGS. 1-4 show first and second shaft elements 11, 12, which are integrated in the drainage-body system according to FIGS. 5, 6, along with a drainage-body system 10. The shaft elements 11, 12 are disclosed and claimed both in connection with the drainage-body unit and separately, i.e., individually.

The drainage-body system shown in FIGS. 5, 6 may be used, e.g., for rainwater retention, rainwater storage, or as a fire-water storage tank in connection with a drainage-body system. Further applications are possible.

Drainage-body systems are made up of individual drainage-body elements, which are sealed, e.g., by PE-film sheets, or other means. In use, the drainage-body elements are filled up with a filling material, e.g., gravel.

As shown in FIGS. 5, 6, the drainage-body unit consists of three components, i.e., a first shaft element 11 with a treatment element 13, a second shaft element 12 with a throttle element 16, and a drainage-body element 10.

In another embodiment, the drainage-body unit may have several drainage-body elements 10. The drainage-body unit forms an independent component that combines several functions, i.e., a treatment function, a storage function, and a discharge function. To this end, the aforementioned components are interconnected both mechanically and fluidically.

The drainage-body element 10 is arranged between the two shaft elements 11, 12. The two shaft elements 11, 12 and the drainage-body element 10 are located in one and the same level and have a continuous, uniform bottom area. In other words, the two shaft elements 11, 12 and the drainage-body element 10 are located in alignment and form a rectangular block. The drainage-body unit has a fluid inlet 14 in the first shaft element 11 and a fluid outlet 18 in the second shaft element 12 allowing rainwater to flow into and out of the drainage-body unit.

As can be seen in FIG. 6, the fluid inlet 14 of the first shaft element 11 is positioned higher than the fluid outlet 18 of the second shaft element 12, thus giving rise to a gradient between the two shaft elements 11, 12. The fluid inlet 14 of the first shaft element 11 and the fluid outlet 18 of the second shaft element 12 are arranged horizontally. The fluid inlet 14 and the fluid outlet 18 extend in opposite directions. A different orientation, e.g., at an angle, is possible. The orientation of the fluid inlet 14 and the fluid outlet 18 depends on the installation and the corresponding orientation of the respective functional element, i.e., the treatment element 13 and the throttle element 16, in the respective shaft element 11, 12. The drainage-body element 10 is a per-se-known drainage-body element, which is made up of two basic elements, each having columns arranged in diametrically opposed directions. The columns are interconnected in front. The two basic elements form the bottom and the lid of the drainage-body element 10. The external sides of the drainage-body unit are bounded in the area of the drainage-body element 10 by grid-shaped side walls, which in FIG. 5 are omitted for reasons of presentation, or, when in use, formed by side walls of adjacent drainage-body elements of the overall system.

As can be seen in FIG. 5, the drainage-body element 10 is immediately adjoins the adjacent shaft element 11, 12. In this area, the side walls of the drainage-body element 10 are omitted, such that the side walls of the first shaft element 11 and the side walls of the second shaft element 12 define the lateral surfaces of the drainage-body element 10. Thus, the direct fluid connection between the two shaft elements 11, 12 and the drainage-body element 10 is formed.

The drainage-body element 10 is known to the applicant under the trademark Stormbrixx. Other drainage-body elements may be used.

The two shaft elements 11, 12 are shaft substructures, each with an enclosed base and enclosed walls. The shaft elements 11, 12 each have an access opening for access from above, which is connected to a shaft superstructure 19. The functional elements located in the two shaft elements 11, 12 are mounted by means of the shaft superstructures 19, and are accessible for maintenance. As can be seen in FIG. 6, the first shaft element 11 has the fluid inlet 14, which projects through the side wall into the interior of the first shaft element 11 in the form of a pipe.

The second shaft element 12 has the fluid outlet 18 in the form of a pipe, which projects inward through the side wall of the second shaft element 12.

A wall opening is formed on the side of the first shaft element 11 opposite the fluid inlet 14, through which wall opening the first shaft element 11 is in direct fluid communication with the adjacent drainage-body element 10. A wall opening is similarly formed on the side of the first shaft element 12 opposite the fluid inlet 14, through which wall opening the first shaft element 11 is in direct fluid communication with the adjacent drainage-body element 10.

When in use, rainwater enters the first shaft element 11 through the fluid inlet 14, and from there, through the wall opening via the drainage-body element 10 into the second shaft element 12. From there, the rainwater is discharged through the fluid outlet 18.

The structure of the first shaft element 11 is explained in more detail below by means of FIGS. 3, 4. The first shaft element 11 has the aforementioned fluid inlet 14 in the form of a pipe, which projects horizontally into the interior of the shaft element 11 in the upper area of the shaft element 11. On the opposite side of the first shaft element 11, a fluid outlet 15 is formed in the shape of the aforementioned wall opening. The treatment element 13 is located between the fluid inlet 14 and the fluid outlet 15. In the example shown in FIG. 4, the treatment element 13 is designed as a slotted screen, which extends transversely relative to the fluid inlet 14. Other treatment elements are possible.

The treatment element 13, specifically the slotted screen, is located in a guide and/or folding device 20. The guide and/or folding device 20 divides the first shaft element 11 into a treated side and an untreated side. To this end, the guide and/or support device 20 is designed as a vertical pipe, which is closed at least at the bottom.

Location information such as below, above, to the side etc. refer to the installed condition of the respective elements discussed.

The pipe is located inside the first shaft element 11 and is firmly connected, e.g., welded thereto. Inside the pipe, there are guide and/or support rails (not shown), in which the slotted screen is attached. The slotted screen may be extracted from the rails for maintenance.

As can be seen in FIG. 4, the fluid inlet 14 is connected to the guide and/or support device 20 in a fluid-tight manner. Specifically, the pipe forming the fluid inlet 14 is connected, e.g., welded, to the pipe forming the guide and/or support device 20. Thus, the rainwater flowing in through the fluid inlet 14 only reaches the guide and/or support device 20, i.e., the sewage settling chamber formed in front of the slotted screen. On the other side of the slotted screen, the pipe has an opening 23, which discharges into the interior of the first shaft element 11. Thus, the guide and/or support device 20 is in fluid connection with the fluid outlet 15.

Figure 1:
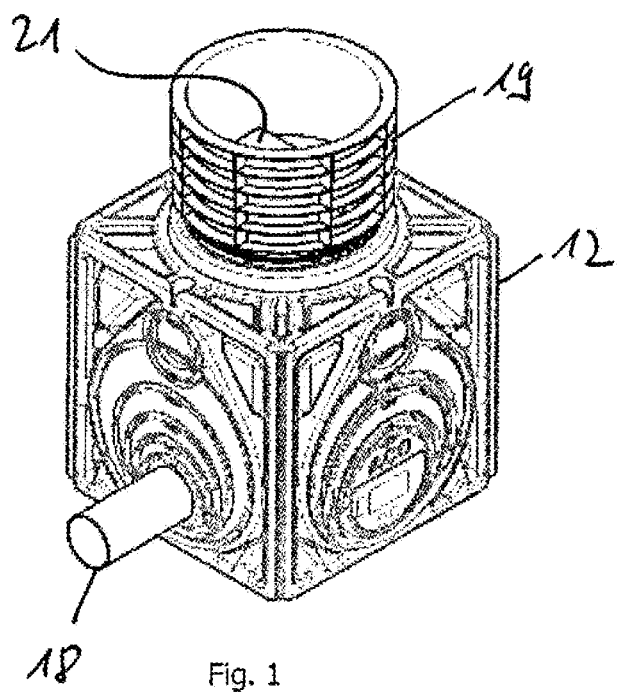
FIG. 1 is a perspective view of a shaft element with a throttle element according to an exemplary embodiment of the invention.
Figure 2:
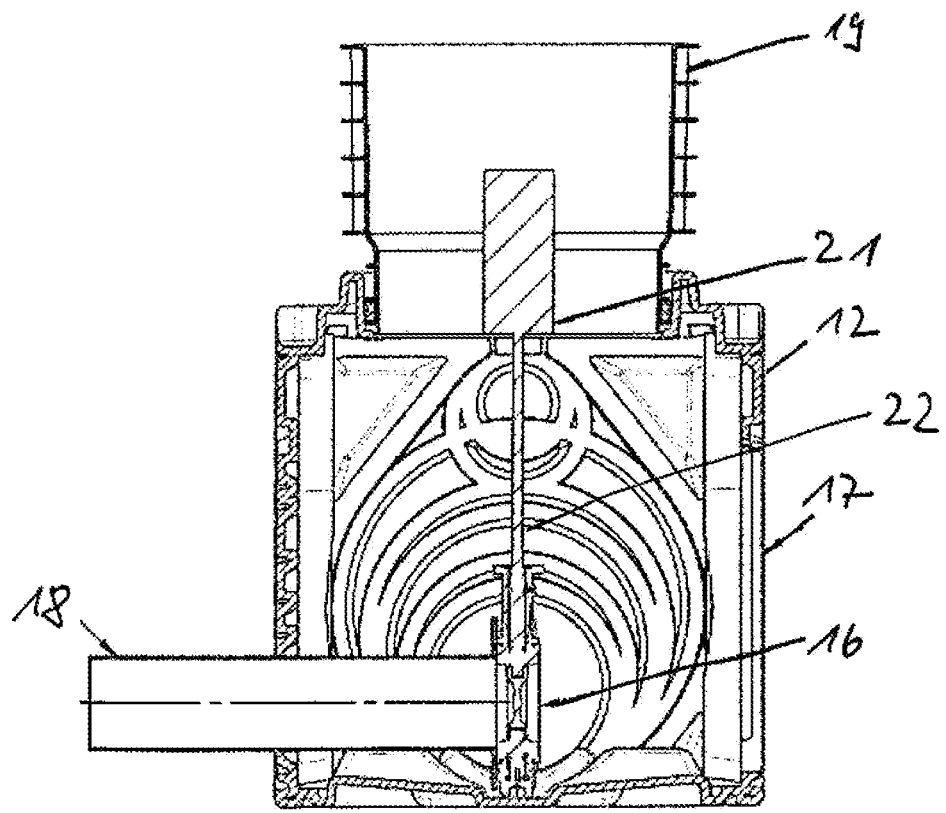
FIG. 2 is a section of the shaft element according to FIG. 1

This side forms the treated side. The second shaft element 12 is shown in FIGS. 1, 2. The second shaft element 12 has a shaft substructure, which is constructed like the first shaft element 11. In this context, reference is made to the comments on the first shaft element 11.

The second shaft element 12 has a throttle element 16, which is located in the substructure of the second shaft element 12. The throttle element 16 is directly connected to the fluid outlet 18, specifically to the pipe forming the fluid outlet 18, in a fluid-tight manner. On the side of the second shaft element 12 opposite fluid outlet 18, the fluid inlet 17 of the second shaft element 12 is designed in the shape of a wall opening. When installed, the wall opening directly adjoins the drainage-body element 10, such that a direct fluid connection Is formed between the second shaft element 12 and the drainage-body element 10. When in use, the second shaft element 12 is flooded with treated rainwater through the wall opening. The throttle element 16 discharges rainwater in a controlled way through the fluid outlet 18. The fluid outlet 18 is located in the lower area of the shaft element 12, and extends horizontally in the form of a pipe from the throttle element 16 out of the second shaft element 12.

The throttle element 16 is controlled, in particular remote-controlled, such that dynamic regulation of the rainwater run-off is possible. To this end, the throttle element 16 is connected to a servomotor 21 by means of an adjusting rod 22. The servomotor 21 is located above the second shaft element 12 in shaft structure 19. The throttle element 16 may, e.g., comprise a throttle valve, or a knife gate valve, or means for mechanical pipe formation.

When in use, the drainage-body unit shown in FIGS. 5, 6 is integrated into a drainage-body system consisting of a plurality of drainage-body elements 10. If the drainage-body elements 10 are located on several levels, the drainage-body unit is installed on the lowest level. For this purpose, the drainage-body element 10 of the drainage-body unit is connected to other drainage-body elements of the overall system in a per-se-known manner, such that the drainage-body unit forms the inlet and outlet of the overall system.

In summary, a drainage-body unit is proposed, which comprises all the aforementioned components in one component. For this purpose, the treatment unit and the throttle unit are integrated into the drainage body or the drainage-body unit.

For this purpose, the treatment unit and the throttle unit are each Integrated in a shaft, which Is suitable for the drainage-body system. This ensures that the shafts match the drainage-body system functionally, and that the whole drainage-body system may be Installed in one Installation pit. The treatment and throttling unit are located in the lower area (lowest level) of the drainage body.

The treatment unit in the shaft comprises, e.g., a slotted screen or sedimentation, adsorption, and any type of mechanical pretreatment in order to filter the Inflowing water. The slotted screen may be Inserted in a shaft (guide cylinder) mounted in the shaft, and hence is easy to maintain, as it can be simply pulled out and upward, when contaminated. Depending on the height of the drainage body or the drainage-body unit, a corresponding slide extension may be formed between the slotted screen and the surface of the drainage body. The inflowing water Is guided through the inlet pipe directly Into the guide cylinder to the slotted screen, and then passes, as treated, through the slotted screen into the drainage body. A gap Is provided between the bottom of the shaft body and the slotted screen. The sewage settling chamber in the guide cylinder in front of the slotted screen should be maintained at regular Intervals depending on its capacity. Opposite the outlet side of the slotted screen, there is an opening in the guide cylinder, such that the water from the slotted screen may flow into the drainage body. The size of the opening of the guide cylinder is chosen, such that the water may flow unimpeded into the drain without unnecessary flow resistance. The slotted screen Is arranged vertically, and is connected to the guide cylinder via guide rails located on either side. The guide cylinder may be supported on shaft-body ribs and, e.g., be permanently welded thereto.

The throttle unit may have a throttle valve/flanged valve in Its Interior, which may be used to control the outflowing water.

REFERENCE NUMERAL LIST

10 Drainage-body element
11 First shaft element
12 Second shaft element
13 Treatment element
14 Fluid inlet of the first shaft element
15 Fluid outlet of the first shaft element
16 Throttle element
17 Fluid inlet of the second shaft element
18 Fluid outlet of the second shaft element
19 Shaft structure
20 Guide or folding device
21 Servomotor
22 Adjusting rod
23 Opening

The invention claimed is:

1. A drainage-body unit with at least one drainage-body element (10), at least one first shaft element (11), and at least one second shaft element (12), wherein
a treatment element (13) is located in the first shaft element (11) between a fluid inlet (14) and a fluid outlet (15),
a guide and/or support device (20) for the treatment element (13) is located in the first shaft element (11), the guide and/or support device (20) divides the first shaft element (11) into a treated side and an untreated side, the guide and/or support device (20) comprises a pipe fluid-tightly connected to the fluid inlet (14) of the first shaft element (11) on the untreated side, and has an opening (23) on the treated side, which forms a fluid connection with the fluid outlet (15) of the first shaft element (11),
a throttle element (16) is located in the second shaft element (12) between a fluid inlet (17) and a fluid outlet (18), and
the shaft elements (11, 12) are fluid-connected or fluid-connectable to one or several drainage-body elements (10).

2. The drainage-body unit according to claim 1, characterized in that the shaft elements (11, 12) and the drainage-body element (10), or several drainage-body elements (10), are integrated in a single, uniformly manageable component.

3. The drainage-body unit according to claim 1 or 2, characterized in that the drainage-body element (10), or several drainage-body elements (10), are located between the shaft elements (11, 12).

4. The drainage-body unit according to claim 1, characterized in that the shaft elements (11, 12) and the drainage-body element (10), or several drainage-body elements (10), are located on a same level.

5. The drainage-body unit according to claim 1, characterized in that the fluid inlet (14) of the first shaft element (11), and the fluid outlet (18) of the second shaft element (12) are located on different levels.

6. The drainage-body unit according to claim 1, characterized in that the fluid inlets (14, 17) and the fluid outlets (15, 18) are each arranged horizontally.

7. The drainage-body unit according to claim 1, characterized in that the fluid connection of the shaft elements (11, 12) to the drainage-body element(s) (10) forms a direct connection through immediately adjacent wall openings.

8. The drainage-body unit according to claim 1, characterized in that the shaft elements (11, 12) are designed as shaft substructures, each having an access opening providing access from above, a closed bottom and closed walls, where the fluid inlets (14, 17) and the fluid outlets (15, 18) are located.

9. The drainage-body unit according to claim 1, characterized in that the shaft elements (11, 12) have shaft structures (19).

10. The drainage-body unit according to claim 1, characterized in that the treatment element (13) has at least means for treating fluid from a slotted-screen group, means for sedimentation, means for adsorption, and means for mechanical pretreatment.

11. The drainage-body unit according to claim 1, characterized in that the throttle element (16) comprises a controlled throttle element, which is connected to a servomotor (21).

12. The drainage-body unit according to claim 11, characterized in that the servomotor (21) is located above the second shaft element (12).

13. The drainage-body unit according to claim 1, characterized in that the throttle element (16) is connected on the outlet side to the fluid outlet (18) of the second shaft element (12) in a fluid-tight manner.

14. The drainage-body unit according to claim 1, characterized in that the throttle element (16) comprises a throttle valve or a throttle with a knife gate valve or a throttle for mechanical pipe formation.

15. A drainage-body system comprising several drainage-body elements and at least one drainage-body unit according to claim 1, which is connected to the drainage-body elements.

16. The drainage-body unit according to claim 1, the throttle element (16) is connected to a servomotor (21) and fluid-tightly connected to the fluid outlet (18).

17. A drainage-body unit with at least one drainage-body element (10), at least one first shaft element (11), and at least one second shaft element (12), wherein
- a treatment element (13) is located in the first shaft element (11) between a fluid inlet (14) and a fluid outlet (15),
- a guide and/or support device (20) for the treatment element (13) is located in the first shaft element (11), the guide and/or support device (20) divides the first shaft element (11) into a treated side and an untreated side, and the guide and/or support device (20) has guide or support rails, in which the treatment element (13) is located,
- a throttle element (16) is located in the second shaft element (12) between a fluid inlet (17) and a fluid outlet (18), and
- the shaft elements (11, 12) are fluid-connected or fluid-connectable to one or several drainage-body elements (10).

18. The drainage-body unit according to claim 17, the guide and/or support device (20) is fluid-tightly connected to the fluid inlet (14) of the first shaft element (11) on the untreated side, and has an opening (23) on the treated side, which forms a fluid connection with the fluid outlet (15) of the first shaft element (11).

19. The drainage-body unit according to claim 17, the treatment element (13) is a slotted screen.

\* \* \* \* \*